United States Patent
Beale et al.

(10) Patent No.: US 6,216,842 B1
(45) Date of Patent: Apr. 17, 2001

(54) OBJECT CONVEYING SURFACE WITH LINER AND METHOD OF APPLYING THE LINER TO THE SURFACE

(75) Inventors: Scott Andrew Beale, Clifton Park, NY (US); James Michael Ritter, Bennington, VT (US)

(73) Assignee: Tonoga Limited, Petersburgh, NY (US)

( * ) Notice: Subject to any disclaimer, the term of this patent is extended or adjusted under 35 U.S.C. 154(b) by 0 days.

(21) Appl. No.: 09/410,297

(22) Filed: Sep. 30, 1999

Related U.S. Application Data (63) Continuation-in-part of application No. 09/049,817, filed on Mar. 27, 1998.

(51) Int. Cl.[7] .................................................. B65G 11/00
(52) U.S. Cl. ............................ 193/20; 193/2 R; 193/22
(58) Field of Search ........................... 193/2 R, 22, 37, 193/38, 20; 198/735.3, 860.3

(56) References Cited

U.S. PATENT DOCUMENTS

| | | | |
|---|---|---|---|
| 3,566,501 | 3/1971 | Winchester | 29/157.3 |
| 3,598,460 | * 8/1971 | Conrath | 118/77 X |
| 3,787,281 | 1/1974 | Effenberger | 161/188 |
| 4,054,194 | * 10/1977 | Davis | 193/25 R |
| 4,234,182 | * 11/1980 | Camilleri | 193/2 R |
| 5,230,937 | 7/1993 | Effenberger et al. | 428/113 |

FOREIGN PATENT DOCUMENTS

| | | |
|---|---|---|
| 36 33 036 A1 | 3/1988 | (DE) . |
| 39 05 343 A1 | 8/1990 | (DE) . |
| 42 19 636 A1 | 12/1993 | (DE) . |
| 0 479 592 A2 | 4/1992 | (EP) . |

OTHER PUBLICATIONS

Database WPI, Section Ch, Week 8749, Derwent Publications Ltd., London, GB; Class A14, AN 87–345495, XP002107352 & JP 62 249740 A (Kansai Honuno Kagak), Oct. 30, 1987.

Database WPI, Section Ch, Week 8612, Derwent Publications Ltd., London, GB; Class A18, AN 86–078212, XP002107353 & JP 61 026631 A (Tokai Kogyo Co Ltd), Feb. 5, 1986.

* cited by examiner

Primary Examiner—Christopher P. Ellis
Assistant Examiner—Gene O. Crawford
(74) Attorney, Agent, or Firm—Heslin & Rothenberg, P.C.

(57) ABSTRACT

A non-stick liner for facilitating the transport of objects along a stationary transport substrate comprises a fabric coated with PTFE, or a laminate of multiple layers of fabric coated with PTFE. The laminate may include a conductive material to dissipate electrical charge buildup. The liner may be selectively applied to identified portions of a stationary transport substrate where buildup, blocking, bridging, or sticking of objects has or is likely to occur. The liner may be mechanically fastened or adhesively bonded to the stationary transport substrate.

35 Claims, 7 Drawing Sheets

OBJECT CONVEYING SURFACE WITH LINER AND METHOD OF APPLYING THE LINER TO THE SURFACE

CROSS REFERENCE TO RELATED APPLICATIONS

This is a continuation-in-part of our co-pending U.S. application Ser. No. 09/048,817 filed Mar. 27, 1998 the entire disclosure of which is hereby incorporated by reference.

BACKGROUND OF THE INVENTION

1. Field of Invention

This invention relates to an apparatus used to transport, convey, or move various objects, such as packages and the like, from one location to another. More particularly, this invention relates to a liner for installation on surfaces on which objects are transported, conveyed or moved, and a method of installing such liner to such surface.

2. Description of the Prior Art

In the package shipping industry, a package is processed for transshipment using a stationary chute along which the package is caused to be moved along by an external force, such as gravity. The chute may come in various sizes and shapes, such as an inclined slide with a stopper wall or horizontal plane at the bottom thereof, a spiral channel going from one floor to another, a circular angled flat surface, etc. The term "chute," is defined elsewhere herein. Almost every package shipping and processing station has one or more chutes which are used in the processing of the packages.

The most troublesome problem in the package shipping industry has been the continual pile-up or build-up of the packages in the chutes. The packages inevitably tend to stick and/or bridge, and cause a back-up of the packages and a shut down of the conveying line. This problem may be caused most often by defective design of the chutes as well as by such factors as humidity (e.g. the packages are wet) and the condition and/or composition of the packages (e.g. "shrink wrapped" plastic coating). There is poor compatibility between the chute surface and the packages. But, due to cost and other considerations, there has been very little change in the structural design of the chutes. Thus, in the prior art, the problem of package build-up, bridging, sticking, backup, and the like, has been approached in an ad hoc manner as to solutions for such problem. Some of these approaches are as follows, none of which are satisfactory.

The most obvious solution and one which has been the most expensive has been for the operator to stop the transporting line, and then go to the chute location where there is bridging, etc, and using a pole or other ad hoc tool, knock the packages around until the back-up problem is solved. Unfortunately, many of the problems occur in hard to reach places. Thus, the human operator is often injured while trying to solve the problem. This increases considerably the Workman's Compensation rate, injury to the worker, and conveying line down time. Also, recent tightening of OSHA rules makes this solution outdated. In other words, this ad hoc solution is no longer feasible.

Also, when the packages are "wet" or "shrink wrapped", the transport surface of the chute was sprayed or painted with graphite paint or paraffin wax partially diluted with water. However, this solution was not satisfactory because of the costs involved and because of the contamination caused to other packages and other parts of the conveying system, such as to moving conveyor belts which would become coated with the wax and/or graphite and require frequent and costly replacement. Also, this solution is really no solution since the wax and/or graphite would be effective at most for only a day or so because most of the coating would tend to stick to the packages and be taken away thereby. In this type of solution, we can also include use of oils and other similar material, which also have the same problem.

Another solution attempted in the prior art was covering the transport surface with a thick sheet (over ¼") of UHMW (ultra high molecular weight) polyethylene. Although the polyethylene layer appears to be "slick", in point of fact, it is inherently sticky in effect. The material tends to abrade in a manner similar to a sheet of plywood which may sliver and itself thereby cause packages to bridge and stick. Once abraded, the UHMW polyethylene layer's coefficient of friction and surface energy will begin to have an adverse effect on movement of the package placed on its surface. Also, disadvantageously, the process of applying this UHMW layer is time consuming because it must be cut, bevilled, drilled, and countersunk with screws. The cost of installation is thus almost prohibitive. Accordingly, this solution is not satisfactory.

A further solution was recently suggested, but was found to have too many disadvantages to be economically feasible. This was to make the chutes of molded fiber glass with a high build epoxy coating on the conveying surfaces. It was discovered that such chutes fractured easily, were difficult to repair, were of brittle material, and had inadequate release properties. Thus, rather than solve the problem of build up, this type of chute caused almost the same problem of build-up and accordingly, the problem was not solved satisfactorily.

In addition to the problems associated with the transport of objects in the package shipping industry, similar problems arise within food processing, manufacturing of trade goods, and other industries where it is necessary to transport objects along a transport surface.

In the food processing industry various raw materials are combined and prepared into a food product for shipment to a retail store. This processing requires the transport of objects from various locations within a facility, to a preparation area and then once prepared, to various locations to be shipped. Such a facility may have problems, in many locations, with the buildup of various types of objects. These types of problems have been addressed by lubricating the transport surface. The most common lubrication methods have been to grease and/or flour the transport surface. However, this solution requires the continual re-greasing and/or re-flouring of the transport surface as the lubricant is worn away. This increases cost in both materials and the time necessary to continually apply the lubricant.

Therefore, there exists a need for facilitating the transport of objects on a stationary transport surface, to prevent the continual build-up, bridging, or sticking of objects in a transport system.

SUMMARY OF THE INVENTION

Thus there is a particular need for an apparatus which remedies the aforementioned deficiencies in the prior art. In an exemplary embodiment of the invention, a chute for conveying an object comprises a stationary transport substrate and a liner in sheet form with a non-stick coating, which liner is securable to the stationary transport substrate. The liner may be mechanically secured to the stationary transport substrate or an adhesive may be used to bond the liner to the stationary transport substrate. The liner may comprise a fabric coated with a non-stick coating, a laminate comprised of multiple non-stick coated fabric layers, or a laminate comprised of multiple non-stick coated fabric layers having on one side a conductive material which can dissipate electrical charges. The liner may be secured to the entire stationary transport substrate, or only identified portions of the substrate where objects may block the transport of other objects.

This construction has a number of advantages over the prior art. The non-stick liner facilitates the movement of objects on a stationary transport substrate, substantially eliminating build-up, bridging, or sticking of objects in the transport system. The non-stick coated fabric and fabric laminate provide increased wear resistance for heavy flow areas, relieving the continual need to reapply a lubricant to the transport substrate. The identification of areas within the transport system, where objects may build-up, bridge, or stick, and targeting of only those areas for lining greatly reduces the costs involved for improving the transport system.

DETAILED DESCRIPTION

Figure 1:
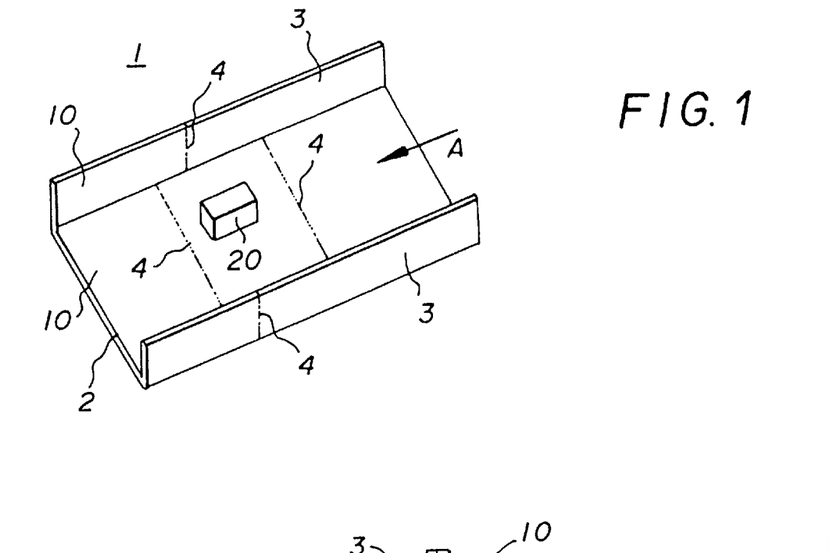
FIG. 1 is a perspective view depicting an illustrative embodiment of the invention encompassing a chute transport surface.
Figures 2, 3:
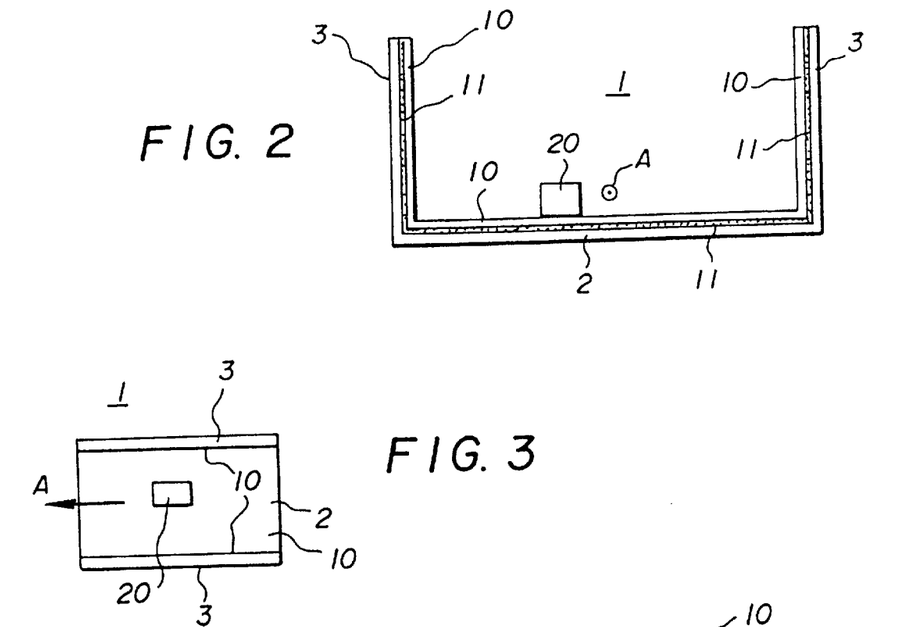
FIG. 2 is a front elevational view of the embodiment of FIG. 1.
FIG. 3 is a top view of the embodiment of FIG. 1.

Turning now to FIGS. 1,2 and 3, a stationary chute 1 comprises, for example, a flat transporting surface or substrate 2 and a pair of side walls or panels 3 disposed generally perpendicular to the flat transport surface 2. The chute may be made of a suitable material which may be metallic or non-metallic, such as cold rolled steel, galvanized steel, aluminum, wood, wood fiber composition, plastic, fiberglass with epoxy coating, etc, and comprises usually a plurality of panels which are welded or otherwise connected together. Most of the chutes used in the package shipping industry are made of steel, and the component panels are usually welded together, although some are formed by interconnecting joints. The interconnections, such as welds, are shown with lines 4 in FIG. 1. In industry, the stationary chutes are used to hold and move the objects 20 from one station or location to another, such as in the direction shown by arrow A, by force of gravity or movement of objects 20 through application of an outside force. The invention is directed preferably to stationary chutes wherein objects are moved by an outside force such as gravity.

Figure 4:
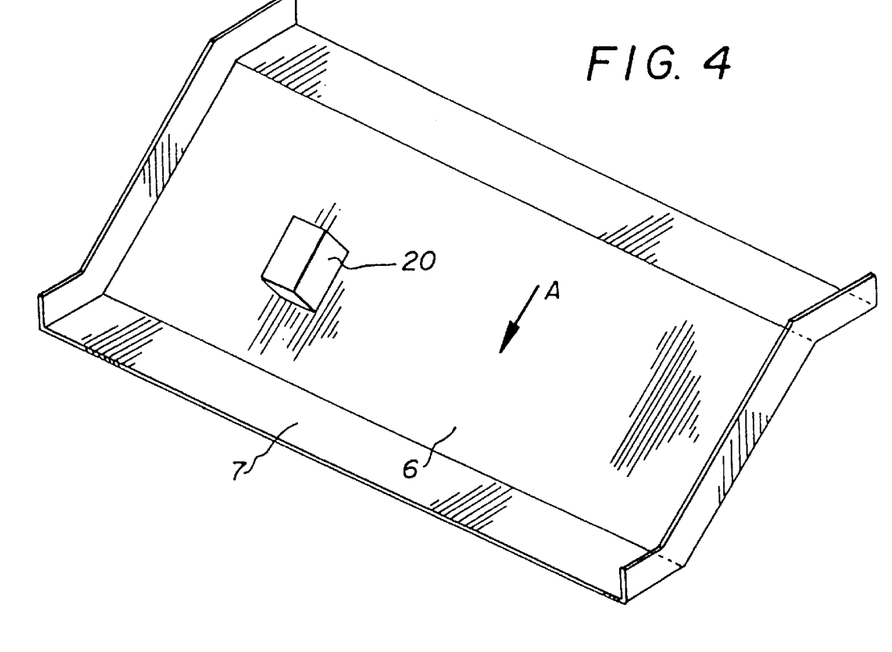
FIG. 4 is a perspective view of another illustrative embodiment of the invention encompassing an inclined slide transport surface.

The chutes may comprise any number of shapes, sizes, and styles and this invention is intended to cover all such chutes which are stationary in function. The chutes may comprise, for example, a slide type which is shown in FIG.4, wherein the slide comprises an inclined sliding surface 6 on which objects 20 are placed and caused by force of gravity to travel down the inclined surface and caused to stop at the bottom thereof by a horizontal surface 7 disposed thereat.

Figure 5:
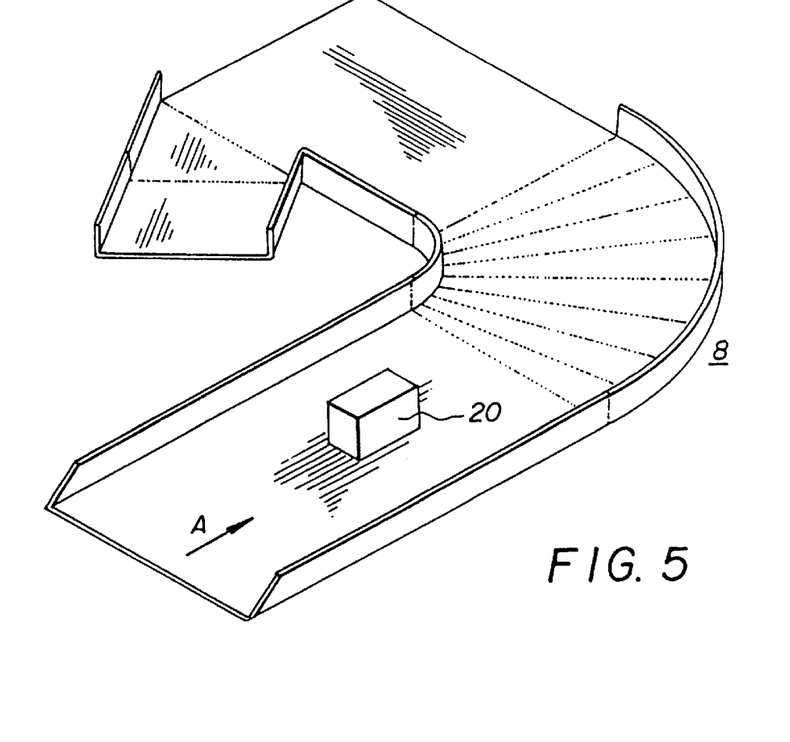
FIG. 5 is a perspective view of a circular chute embodying the invention.
Figure 6:
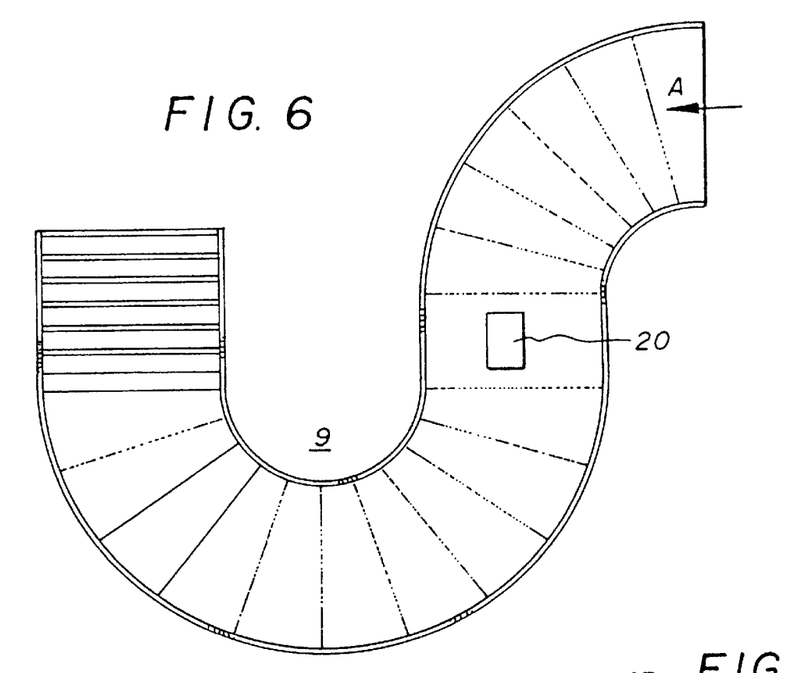
FIG. 6 is a top view depicting a spiral type chute embodying the invention.

Another example of a stationary chute which is covered by the invention is a curved shaped chute 8 shown in FIG. 5. Also, a further example is shown as a spiral shaped chute 9 in FIG. 6. The spiral shaped chute of FIG. 6 may be used to transport objects from one vertical level to another.

The term "chute" as used herein is intended to cover all types, styles, shapes and forms of stationary transport surfaces or substrates on which objects, are transferred, transported, transmitted, conveyed or otherwise moved from one location to another by an outside force, such as gravity. The surfaces may be flat, textured, curved, inclined or of any desired shape and may be combined with or without side walls. Also included may be all types of shapes and angular orientations, such as rectangular, square, curved, trapezoidal, spiral, and horizontal, vertical, or of any desired angle. The chutes may also be made of any desired material, such as those listed above. The material currently in use is steel and the interconnections are welds or joints. It has been discovered by the inventors that for steel substrates, an acrylic adhesive used as a backing for a PTFE liner is especially effective in bonding the PTFE liner to the steel substrate.

The chutes are disposed to be stationary with the transport surface being disposed to be horizontal or at an angle so that an external force, such as gravity, will cause object 20 (in FIG. 1) placed on the transport surface to be moved in the travel direction, shown by arrow "A" in FIG. 1. The objects may be pushed one after another by a pushing force. The invention covers all types of such transport surface or substrate which is stationary and on which packages or other objects are held and moved by an external force. The terms "transfer", "transmit", "transport", "convey", "move" together with the terms "surface" or "substrate", "liner" and the like are used interchangeably to mean the stationary surface on which the objects are disposed and caused to move from one location to another.

Figure 11:
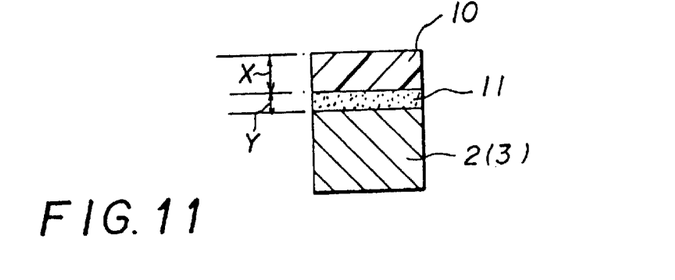
FIG. 11 shows a cross-sectional view of a part of the transport surface having the attached liner.

As shown in FIG. 2 and in an expanded view in FIG. 11, the surface 2 and side walls 3 may be lined with or have attached thereto or bonded thereto, a layer 10 of skived PTFE film or layer with use of an adhesive, such as an acrylic adhesive 11 bonding the film to the surface. Advantageously, film 10 is intimately bonded to the adhesive 11, which in turn is intimately bonded to surface 2.

The skived PTFE film or layer 10, labeled "X" in FIG. 11, is of a thickness of between 5 to 15 mils, and most preferably 10 mils, and adhesive layer 11, labeled "Y" in FIG. 11, is of a thickness of between 0.5 to 5 mils, and most preferably 2 mils. The lower limit of the film 10 is set to 5 mils because a thinner thickness would not be effective for a sufficient time due to rapid abrasion to make the liner economical. The upper limit of 15 mils is set because the thicknesses in excess thereof will not be economical and furthermore the installation of the film would tend to become cumbersome. As for the lower thickness limit of the adhesive, below 0.5 mils thickness would not be sufficiently effective in bonding the film to the substrate. Above 5 mils would be uneconomical and excess thereof would not add any more "tackiness" in bonding the film to the substrate. The preferred thickness of the film 10 is 10 mils in terms of economy, ease of installation and permanence of liner bonded to the substrate. Also, the optimal amount of adhesive of 2 mils is most economical combined with the desired degree of "tackiness".

The thickness of film 10 should be sufficient to allow for abrasion wear over time by the contact of the film with objects moved thereover. As mentioned, it has been found that the PTFE covered transport surface can abrade from 50 to 60 percent and still maintain operational integrity and effectiveness, that is, prevent build-up, bridging, sticking, and the like of the objects moved thereover.

Also, the use of 2 mils thickness of a specific adhesive, namely, an acrylic adhesive was found to be especially effective in providing continued "tackiness" over a long period of time, and was not subject to creep when larger objects unevenly pushed the PTFE layer at concentrated spots.

The skived PTFE film bonded to the transport surface is in sheet form, that is a film, and has the property of offering a lubricious, non-stick surface. It is "soft" and will abrade over a period of time. But, it was discovered by the inventors that the skived PTFE film 10 when attached to substrate 2 by use of the acrylic adhesive over the entire area of the liner could be abraded by the above mentioned 50 to 60% in area and still be operationally effective in preventing package build-up.

Hence, a feature of the invention is that the entire surface area of the skived PTFE film and transport surface be completely covered where the two coincide with the adhesive without any air bubbles or wrinkles in the film. That is to say, where the skived film is attached to the substrate, there exists the adhesive bonding the two together without any air pockets or wrinkles where adhesive does not exist.

The term "PTFE" includes various forms of polymerized or copolymerized tetrafluoroethylene, and more preferably polytetrafluoroethylene. It includes various forms of PTFE in a pure form or combined with a filler. The term "skived" refers to the process of forming the particular type of PTFE film or layer, wherein the PTFE or PTFE combined with filler is subjected to slicing in thin layers. The term "film" or "layer" is used herein to mean of the thickness herein defined. In addition to PTFE, other non-stick coatings may be utilized such as plastic, thermoplastic, polyolefin plastics such as polyethylene or UHMW polyethylene or any other suitable non-stick material. It has been found that UHMW polyethylene, in the form of a roll or tape with adhesive backing may be utilized as an alternative to skived PTFE. UHMW polyethylene may be applied to a transport substrate in a similar manner to the methods described herein for skived PTFE.

A further feature of the invention is the use of a carbon filler in the PTFE. The amount of carbon filler may range from 0.1 to 1.0 percent by weight of the PTFE. It has been discovered by the inventors that the use of a carbon filler in the skived PTFE film or layer prevents static electricity from building up in the chutes.

This is desirable when the objects comprise plastic material or plastic coatings. The lower limit of 0.1 weight percent is set because lower amounts do not seem to be sufficient to prevent static electric buildup. Above the limit of 1.0 weight percent is without further effect in preventing static electric build up, and would be a waste of filler, and increase cost without increased benefit.

The skived PTFE film or layer used in the invention is available on the market and comes in various widths and lengths and is usually rolled. In this invention, because of the manner and extent of the installation, it is preferred that the width thereof range from 5 to 38 inches, with the most preferred width being 18 inches. The lower limit of width is set because for most installations to cover the package shipping chute as a liner therefor, smaller widths would be too expensive in terms of labor for installation, transporting, and placement of adhesive thereon. Widths wider than 38 inches cause problems in adherence of the adhesive, the use of uniform pressure when installing the full width, and causing air bubbles and wrinkling in the installed sheets of skived PTFE film. The preferred width of 18 inches was found to be optimal in terms of ease of installation, reliability of setting, and elimination of air bubbles and wrinkles. The length of the film may be without limit depending on use with the preferred length being between 12 to 200 inches. For certain uses, such as for installation of the film on a large scale, a larger and wider piece can be used.

The skived PTFE film or layer used in the invention is a virgin, skived polymerized or copolymerized tetrafluoroethylene material having an operational temperature of −40 to +350° F. The most preferred material is a skived PTFE film or layer. The film or layer is available in various thicknesses, widths, and lengths as desired.

A feature of the invention is taking the already skived PTFE films of desired widths, thicknesses, and lengths and then adding the adhesive, such as acrylic, silicone, natural and synthetic rubber, and the like with acrylic being most preferred, to one surface thereof in the manner set forth herein. An important feature of the invention is the bonding of the skived PTFE film onto the transport surface of the chute so that the two act as a unitary structure in conveying objects without buildup, bridging or sticking. Accordingly, it is important that the adhesive be of suitable "tackiness" and strength and be readily workable when the PTFE film is bonded to the transport surface. As discussed herein in greater detail, we have discovered that the acrylic adhesive is especially suited for this purpose where the PTFE film is lined on the transport surface of the chute. It is important that the acrylic or other adhesive be intimately bonded to one surface of the PTFE film or layer.

Accordingly, the skived PTFE film is first etched or otherwise carbonized to expose cross-linking molecules to which the adhesive is then attached throughout the entire surface of one side of the skived PTFE film. The surface of the PTFE film may be prepared by use of an etchant, such as sodium-ammonia etchant, or sodium-nathalene etchant. Another method involves use of a colloidal silica mixed with a polymerized or copolymerized TFE dispersion and coated onto the PTFE film. A further method involves a Corona treatment.

After such treatment, the adhesive is uniformly covered over the prepared surface of the skived PTFE film, such as by use of a blade or similar tool. Then, on top of the layer of adhesive, a release liner, such as polyethylene layer, is added so that the adhesive will not inadvertently adhere to an unwanted surface during storage, transport or installation. It is to be understood that the covering of the skived PTFE film on one side thereof with the adhesive after etching or other preparation of the one surface, is an important feature of the invention. Also, advantageously, the arrangement is pressure sensitive so that use of pressure to the PTFE film attaches the film to the substrate in an intimate bonding.

As stated before, the operating temperature ranges from −40 to +350° F. which is suitable for most uses. The installation of the film with adhesive on the chute surface should be done at a temperature of no less than 30° F. for best results. Below such temperature, the adhesive will not stick properly to the surface. After the release liner is placed on top of the adhesive, the entire PTFE film, adhesive and release liner are rolled for convenience of handling, transport, and installation.

When the skived PTFE film, adhesive and release liner of rolled, because of the memory properties of the PTFE, there is a tendency of the film to continue to be rolled so that the film will curl up again in the same manner as previously rolled. It was discovered by the inventors that best results in installation were obtained, by first unrolling the film, adhesive and release liner, and then reverse rolling the film, adhesive and release liner, prior to installation. By such reverse rolling, it was discovered that attachment of the adhesive and film was enhanced with the film having just the right amount of curl to aid installation. Thus, with such reverse rolling, installation was made more efficient, less time consuming, and resulted in increased accuracy of installation and increased reliability. Although this reverse rolling may seem simple, the importance of such step cannot be overlooked because of the advantages gained by such reverse rolling.

Although acrylic adhesive is preferred, where specifications are looser, consideration may be given to other types of adhesives, such as silicone adhesive, natural rubber adhesive, synthetic rubber adhesive, and the like. But, such other adhesives may tend to increase bunching of the PTFE film due to reduced "tackiness" of the other adhesives. Advantageously, the acrylic adhesive has an excellent "tackiness" and when bonded to one surface of the skived PTFE film, has an excellent "tackiness" to the substrate and provides excellent bonding between the film and substrate. Also, advantageously, the acrylic adhesive has an almost indefinite shelf life and its adhesive value does not deteriorate with time as do many other types of adhesives.

An important property of the installed skived PTFE film or layer is its lubricious, non-stick property. Thus, objects placed and moved on the chute lined with the PTFE liner move more easily whether under force of gravity or other motive power, without causing any build-up, bridging, or sticking. The invention incorporates the skived PTFE film or layer onto the transport surface or substrate with use of the acrylic adhesive.

Alternatively, when a heavy flow of objects, in terms of volume, over a specific area of the transport substrate, creates an area in which the failure rate, wear rate, or abrasion resistance of the liner is not sufficient, a reinforced liner may be used. Such a liner may be necessary on chutes having a 45 and/or 90 degree radius turn, or areas having sufficient incline to necessitate a reinforced liner. Now referring to FIG. 16, the inventive reinforced liner 110 is shown. Liner 110 comprises a coated fabric 112, which has been bonded to transport substrate 116, by an adhesive 114.

Figure 16:
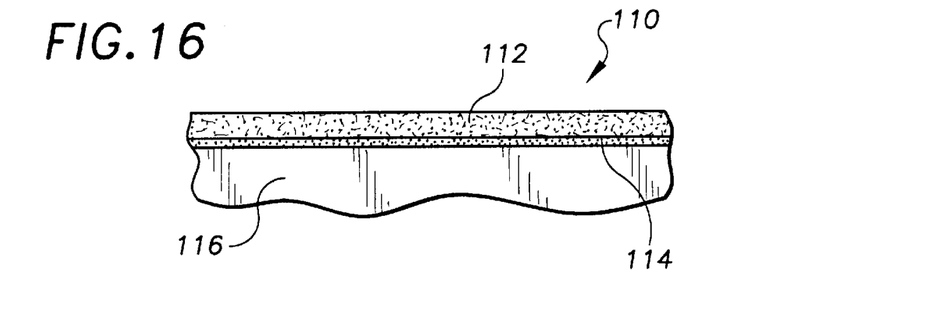
FIG. 16 is a is a side view depicting a coated fabric in accordance with the present invention.

Coated fabric 112 comprises a reinforced material which has been coated with a material having superior non-stick qualities such as PTFE or the like. The preferred reinforced material used is fiberglass or a woven glass matrix fabric due to its availability and low cost combined with the strength and inherent characteristics of the material, however, any suitable reinforced material can be used such as glass, ceramics, graphite (carbon), KEVLAR, NOMEX, metal wire, cotton, cloth, or other natural as well as synthetic textiles which are known in the art. The reinforced material may comprise a yarn, filament, monofilament or any other fibrous material either as such or assembled as a textile, or woven, non-woven, knitted, matted, or felted material. The reinforced material is then coated preferably by repeated cycles of being submerged into a water based PTFE dispersion or resin and then having the PTFE heated or "baked" on. This process is repeated until the coated fabric obtains a desired thickness. Typically, the thickness will be determined by the amount of wear the coated fabric will receive. A thickness of between 10–45 mils has been found to work sufficiently, with a preferred thickness of 14 mils.

Typically coated fabric 112 has a textured outer surface, which resembles the matrix of the fabric. This is accomplished by lightly coating the fabric with PTFE to maintain a textured surface. The textured surface is desirable as a transport surface for rigid objects. A smooth surface creates an increased surface area of contact between a rigid object and the surface. This in turn creates more friction which has the ability to slow or impede object transport. Whereas a textured surface has less surface area contact with a rigid object and therefore less friction is created and the transport of objects along a transport substrate is facilitated. There are, however, circumstances where a smooth surface may be preferred. Such circumstances may arise when it is necessary to transport a malleable object, which may conform its shape to "fit" the textured surface, therefore creating a greater surface area of contact and more friction than would otherwise be present on a smooth surface.

Coated fabric 112 can be mechanically secured to the transport substrate by use of mechanical fasteners and the like, as will be discussed in greater detail hereafter, or it may be adhesively bonded to transport substrate 116. Typically, the non-stick properties of coated fabric 112, prevent adhesion between coated fabric 112 and adhesive 114, therefore prior to applying adhesive 114, the underside of coated fabric 112 should be treated thereby making the surface bondable. This process can be accomplished by coating the underside of coated fabric 112 with colloidal silica dispersed in a copolymer dispersion such as LUDOX or other similar substances which allow the bonding of adhesive 114 to the underside of coated fabric 112. Alternatively, the underside of coated fabric 112 may be prepared by use of an chemical etchant, such as a sodium-ammonia etchant, or a sodium-naphthalene etchant. Also, only one side of the fabric may be coated with PTFE. This allows bonding of the non-coated side to the transport substrate without any preparation, while providing a non-stick surface for facilitating the transport of objects.

Once prepared, coated fabric 112 may be bonded to transport substrate 116 by the use of adhesive 114. Adhesive 114 is preferably an acrylic adhesive having a very high "peel value" and a very high "finger tack", although any suitable adhesive as known in the art may be used. Adhesive 114 is uniformly covered over the prepared surface of coated fabric 112, such as by use of a blade or similar tool. Then, on top of the layer of adhesive, a release liner, such as polyethylene layer, is added so that the adhesive will not inadvertently adhere to an unwanted surface during storage, transport or installation.

As stated before, the operating temperature ranges from −40 to +350° F. which is suitable for most uses. The installation of coated fabric 112 with adhesive on the chute surface should be done at a temperature of no less than 30° F. for best results. Below such temperature, adhesive 114 will not stick properly to the surface. After the release liner is placed on top of adhesive 114, coated fabric 112, adhesive and release liner are rolled for convenience of handling, transport, and installation. When the coated fabric 112, adhesive and release liner are rolled, because of the memory properties of coated fabric 112, there is a tendency of the assembly to continue to be rolled so that coated fabric 112 will curl up again in the same manner as previously rolled. It was discovered by the inventors that best results in installation were obtained, by first unrolling coated fabric 112, adhesive and release liner, and then reverse rolling coated fabric 112, adhesive and release liner, prior to installation.

Coated fabric 112 has the ability to provide a durable non-stick transport surface for high volume areas suffering from excessive abrasion and high failure rates. The reinforced material allows coated fabric 112 to facilitate the movement of objects on a transport substrate, while handling impacts and heavy volume and providing greater abrasion resistance and therefore a longer useable life than previous alternatives. Also, the inherent characteristics of coated fabric 112 prevent the process of gauging, tearing or unintentional removal of portions of liner 110 by objects impacting the liner in a non-raditional manner, or objects having sharp edges.

Figure 17:
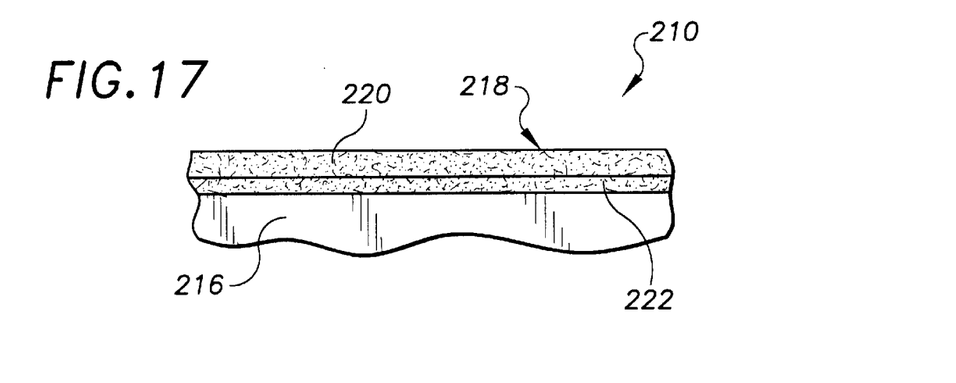
FIG. 17 is a side view depicting a laminate of two coated fabrics in accordance with the present invention.

Alternatively, as illustrated in FIG. 17, a liner 210 may be used to provide a non-stick surface to transport substrate 216. Liner 210 comprises a laminate 218 which is formed from a first coated fabric 220 which has been laminated to a second coated fabric 222. Coated fabrics 220 and 222 are similar in construction to coated fabric 112 described earlier. The lamination process consists of placing coated fabric 220 and 222 one on top of the other, and then subjecting the fabrics to a high temperature while they are pressed together. Typical temperature ranges may be between 550° F. to 800° F., and typical pressure ranges may be between 200 and 1000 p.s.i. Alternatively, a thin layer of adhesive or an adhesive film may be placed between the coated fabrics 220 and 222, which when subjected to high temperature and pressure aids in adhering the layers together. Laminate 218 typically has a thickness of 20–40 mils with 28 mils being preferred, however, the thickness may vary to accommodate the wear anticipated for a particular location on the transport substrate. With a thicker material being used for a high volume, high wear area and thinner materials being used for lower volume, lower wear areas. Laminate 218 may comprise multiple layers of coated fabric in order to obtain the desired thickness.

Laminate 218 may be adhesively bonded to transport substrate 216 as described earlier or it may be mechanically secured to the entire transport substrate, or a portion which has been identified as a critical area. The term "critical area" refers to a location on the transport substrate which has been problematic in the transport of objects. Typically problem areas in the transport substrate have been identified by the continual pile-up or build-up of the objects in the chutes. The objects inevitably tend to stick and/or bridge, and cause a back-up of the objects and a shut down of the conveying line. This problem typically occurs in 45 and 90 degree radius turns as well as areas of high volume and/or heavy impact.

Figure 19:
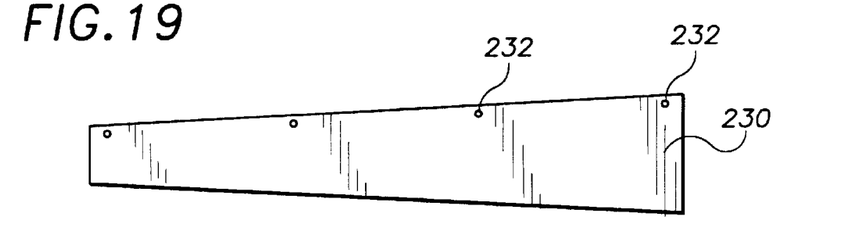
FIG. 19 is a top view of a laminate section constructed in accordance with the present invention.
Figure 20:
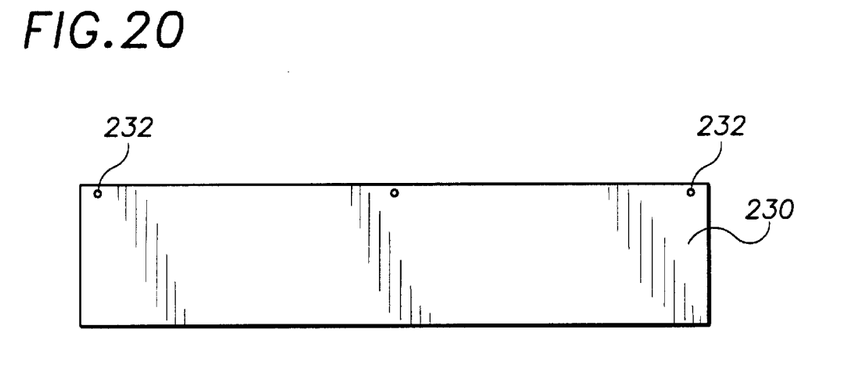
FIG. 20 is a top view of a laminate section constructed in accordance with the present invention.

As illustrated in FIGS. 19 and 20, laminate 218 may be cut into sections 230 having holes 232. Sections 230 can be cut from larger sheets of laminate and can have varying dimensions and shapes as may be required to fit differing areas of the transport substrate. FIG. 19 shows a trapezoidal shape having one end wider than the other. This configuration is advantageous when applying the laminate to a chute which has a 45 or 90 degree radius turn, such as a chute illustrated in FIGS. 5,6 or 21. FIG. 20 shows a section 230 having a rectangular shape, which can be used in straight chutes or other appropriate areas of the transport substrate. Holes 232 are typically placed on the leading edge of sections 230. The leading edge would be the edge which first comes into contact with an object being transported. Holes 232 should be of sufficient diameter to accommodate a mechanical fastener, and are typically placed approximately 2" from the sides or leading edge. The number of holes 232 which would be placed on section 230 will vary depending on the width of the section, however a typical section having a width of 36–52 inches would have 3 to 4 holes evenly placed along the leading edge.

Sections 230 can be mechanically fastened to transport substrate 216 by use of tree bolts also known as tree rivets, ratchet fasteners and Christmas tree clips. Such tree bolts have a ribbed shank for a secure hold and may be pressed into prepared or blind holes. Alternatively, other mechanical fasteners which sufficiently secure sections 230 to transport substrate 216 may be used. The tree bolts may be metal, plastic or other suitable materials and should preferably have a low profile head which does not impede the passage of objects along the transport substrate. The tree bolts may be placed in pre-drilled holes 232 or they may be self-tapping. If the tree bolts are self-tapping, sections 230 do not require the pre-drilling of holes 232.

Figure 18:
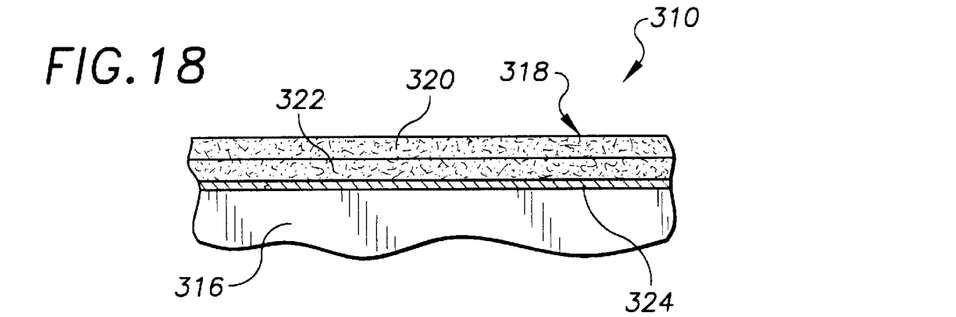
FIG. 18 is a side view depicting a laminate having a conductive material in accordance with the present invention.

Alternatively, as illustrated in FIG. 18, when an area or portion of the transport substrate, has been identified as an area which tends to accumulate static electricity, liner 310 may be used to provide a non-stick surface to transport substrate 316 having the ability to dissipate the static charge. Liner 310 comprises a laminate 318 which is formed from a first coated fabric 320 which has been laminated to a second coated fabric 322. Laminate 318 is similar in construction to laminate 218 described earlier, however laminate 318 has conductive material 324 secured to second coated fabric 322. The lamination process consists of placing coated fabric 320 and 322 one on top of the other, and then placing conductive material 324 on the outer portion of second coated fabric 322, then subjecting the assembly to a high temperature while they are pressed together. The thickness of laminate 318 is similar to the thickness of laminate 218 described earlier. Conductive material 324 is typically a copper foil however any conductive material having the ability to adequately dissipate a static charge may be used.

The installation of laminate 318 requires that conductive material 324 be in contact with transport substrate 316. This allows the static charge build up on the surface of laminate 318 to be dissipated through the laminate and into the transport substrate for adequate grounding through the frame of the transport substrate.

Figure 18A:
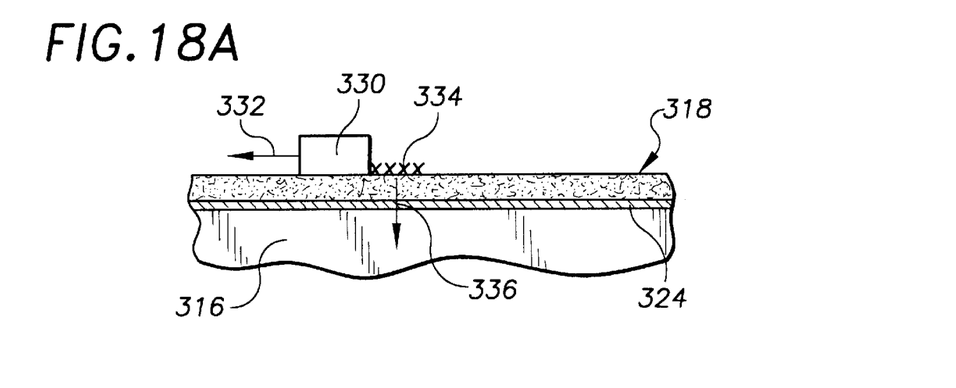
FIG. 18a is a side view depicting a laminate in accordance with FIG. 18, dissipating static electrical buildup, in accordance with the present invention.

As illustrated in FIG. 18a, an object 330, moving in the direction of arrow 332 on laminate 318 may tend to build up a static charge 334. If this charge is not dissipated a worker may be injured if he comes in contact with the charged area. However, laminate 318, having conductive material 324 in contact with transport substrate 316, allows static charge 334 to flow through laminate 318 in the direction of arrow 336 for grounding in the frame of transport substrate 316.

When it is desired to adhesively attach the liner onto the transport surface or substrate it can be done according to the following procedure.

Figure 7:
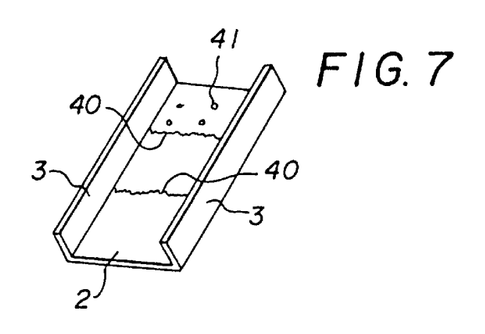
FIG. 7 is a perspective view depicting a chute prior to preparation of the transport surface.
Figure 8:
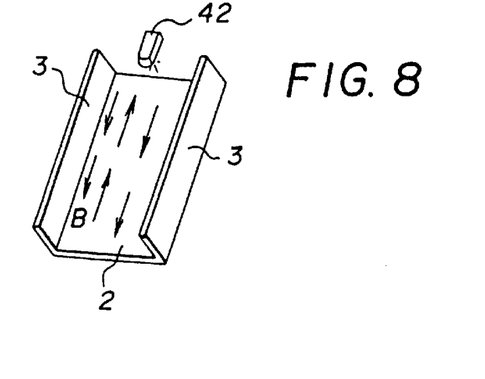
FIG. 8 is a perspective view depicting the embodiment of FIG. 7 showing the cleaning step.
Figure 9:
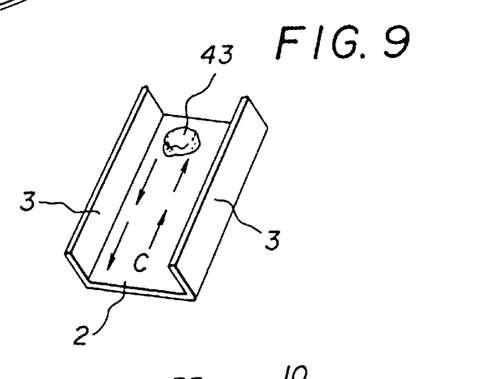
FIG. 9 is a perspective view depicting the embodiment of FIG. 7 and showing a further rinsing step.

PREPARATION OF THE TRANSPORT SURFACE (FIGS. 7–9)

As shown in FIG. 7, all of the contaminants 40,41 on the transport substrate 2, and walls 3, such as welds, breaks, joints, rust, paint, etc, are repaired and/or mechanically prepared, such as by use of a scraper, grinder, sander, etc, until the surface is smooth. The "high spots", which will be discussed in detail in connection with FIG. 14, should be smoothed although not necessarily to the same level as the remainder of the surface.

The entire surface to be lined and the adjacent surfaces are then vacuumed from top or leading end to bottom or trailing end to remove loose contaminants.

Then, as shown in FIG. 8, the smoothed surface is cleaned. From the top or leading end of the chute and working downward toward the trailing end, the chute surfaces 2 and 3 are wiped down using tool and cleaner container 42 which contains a non-soap, non-surfactant cleaner. A preferred cleaner is one containing citrus acid, and has been found to be especially effective in removing contaminants of the type that tends to accumulate on transport surfaces prior to adhesion of the liner using, for example, an acrylic adhesive. A common cleaner available on the market may be used, such as "Goo-Gone" and "Simple Green". This wiping with the cleaner is done from 2 to 5 times, as shown by arrows B, using about 2 ounces per square foot. This will remove residual oil, wax, dirt and other various contaminants of the type that tend to accumulate on the transport surface. The citrus cleaner is advantageously biodegradable, environmentally safe, and does not present any disposal problem.

Following the cleaning step, as shown in FIG. 9, the chute surfaces 2, 3 are rinsed, such as with use of a tool 43, with clean warm tap water or distilled water, for a number of times, such as 2 to 5 times (see arrow C) or until the appearance of the water is clear.

Then, the surfaces are wiped clean and dry from bottom or trailing end to top or leading end using a lint free cloth. Then, the surfaces are allowed to be further dried in air. When the surfaces 2,3 are completely dried, the next step is undertaken.

Figure 10:
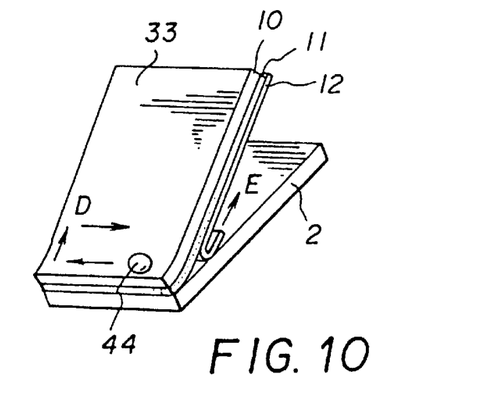
FIG. 10 is a perspective view of the embodiment of FIG. 7 absent the side walls and showing attachment of the liner to the surface.

INSTALLATION OF THE LINER USING ADHESIVE (FIG. 10)

The surface on which the PTFE liner (which shall be defined herein as being either the skived PTFE film, coated fabric 112, laminate 218, or laminate 318, having an adhesive, such as acrylic adhesive, bonded thereto) is to be installed is first measured.

Figures 12, 13, 14, 15:
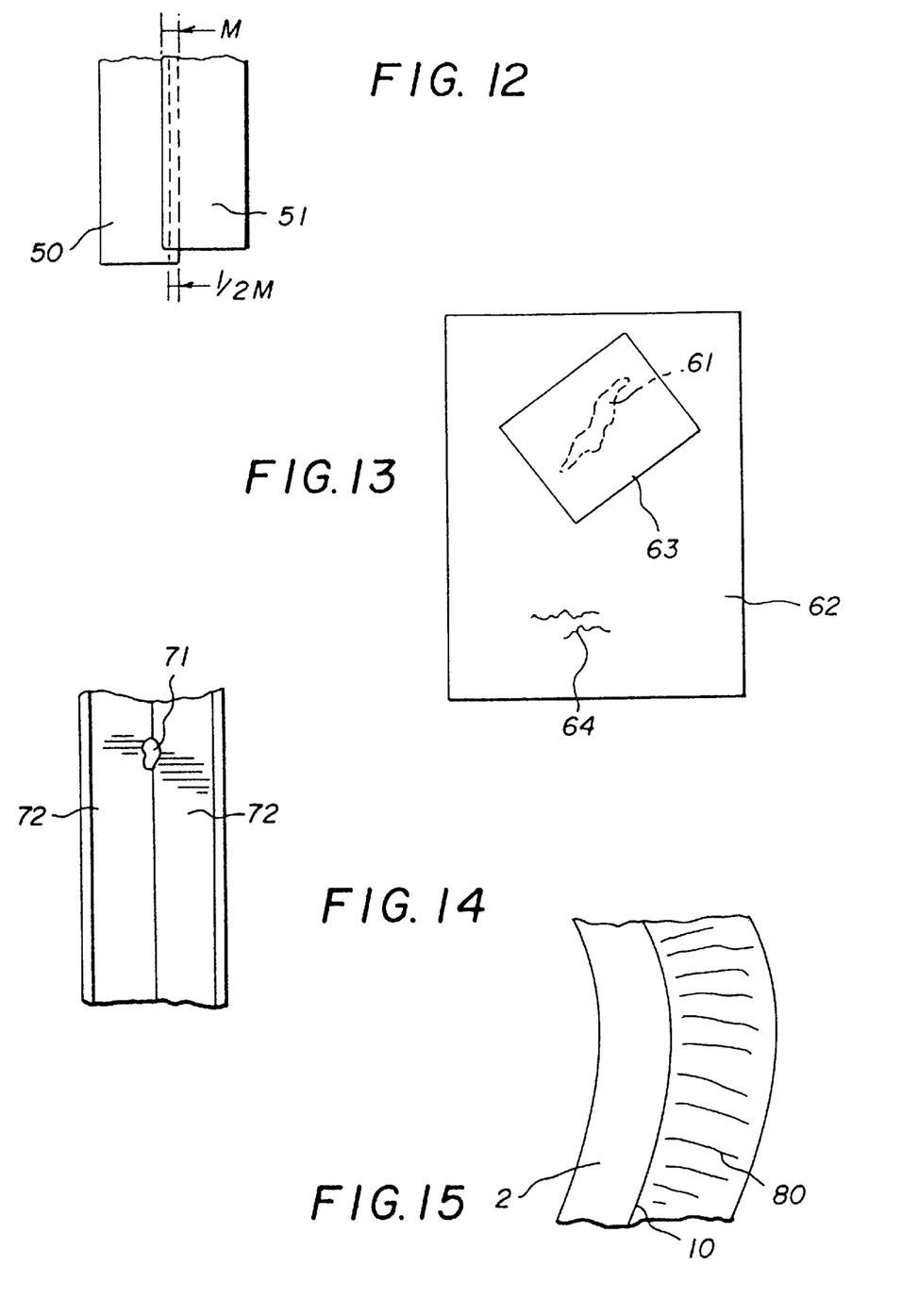
FIG. 12 is a top view depicting two overlapped liners laid on a substrate and showing the overlapping and cutting dimensions.
FIG. 13 is a top view depicting a defect in a liner previously installed on a substrate and repair thereof using a diamond shaped piece.
FIG. 14 is a top view depicting a "high spot" in the transport substrate and disposition of the liner about the "high spot".
FIG. 15 is a top view depicting a "wear path" created in the transport surface by movement of the packages in a biased direction.

At a minimum, the chute surface areas on which the objects most often move (which shall be referred to herein as "wear path") should be covered with the PTFE liner. As shown in FIG. 15, the objects will tend to move on surface 2 in a particular pattern, such as shown by shaded part 80, depending on such factors as the shape of the chute, the angle of incline, etc. That is to say, in different chutes there will be a biased pathway in which the objects will tend to travel. This can be detected by visual or other means as will be discussed hereinbelow in greater detail. In FIG. 15, where there is a slight curve, the objects tend to travel outwardly toward the outer circumference thereof. This is referred to as the "wear path" and is illustrate by shaded part 80. At a minimum, the PTFE film 10 should be bonded to such "wear path" 80 of surface 2 with use of adhesive 11.

However, installing the PTFE liner outside of such "wear path" is also advantageous in that the outside area will also tend to carry the objects and use of the PTFE liner thereon will enhance efficiency and help further deter package build-up, bridging, and sticking. Thus, these non-wear path areas should also be measured.

After measurement of the areas to be lined, for areas less than 36 inches in width, a one piece sheet or strip can be suitably cut for placement over the substrate. If the widths are larger, it was found that the strip of PTFE liner can be first cut, for example, to a maximum width of 18 inches for greatest effectiveness of installation, and a plurality of strips then installed to cover the entire width. The lengths would be cut to size as desired. For ease of installation at remote locations, the widths can be standardized, and a plurality of widths installed one next to the other, with the final width being cut to size at the job site to make up the final deficit in width. The cutting will be done with the release liner 12 still attached to the adhesive 11.

The strips, for example of 18 inches width, of the PTFE liner is preferably applied to the substrate with its lengthwise dimension parallel to the direction of travel of the objects thereon. In this manner, the lengthwise edges which are exposed to the objects do not tend to be caught by the comers or edges of the objects. In point of fact, it has been found that such an orientation assists in enabling the PTFE liner to remain firmly attached to the substrate and thus perform its task of preventing build-up of the objects for an extended period of time.

Returning again to a discussion of "wear path", regardless of the material used in the transport surface, it was discovered by the inventors that the objects moved down the chute and tended to travel in certain paths even though the full travel surface was much larger and equally exposed to the objects being moved. For example, in a chute having horizontal and vertical surfaces, the objects theoretically should touch any of the surfaces. But, in practice, the objects tended to, that is there was a bias toward, follow the same "wear path" until there was a build-up, bridging, sticking, etc in which case, the objects then were disposed all over the different surfaces. To visually detect a wear path, for example, with steel chutes, one should look for the shinier parts of the travel surfaces. A more exact determination can be made using a TV or UV camera and placing a trace substance, such as non-organic powder, on the objects and observing where the substance collects using the camera.

As shown in FIG. 10, after the prior steps of surface preparation, cleaning, rinsing, drying, installation of the PTFE liner was done as follows using the reverse rolling technique to eliminate any prior bias memory.

The installation was started first at the bottom or trailing end of the chute to be lined. For clarity of description, the side rails 3 are omitted from FIG. 10. It is understood that such side rails 3 maybe a part of the chute 1. The side rails 3 may be first lined with the PTFE liner prior to the lining of substrate 2 with the PTFE liner.

(1) From the acrylic adhesive coated PTFE liner, the polyethylene release liner 12 is peeled back from the adhesive 11, in the direction shown by arrow E, about 2 to 3 inches for the full width dimension.

(2) Holding the strip 33 straight and square to the installation area of the transport surface 2, the PTFE liner is firmly adhered to this area, such as by hand rubbing using tool 44 which is a smooth hard tool, in a motion, such as shown by arrow D, that is perpendicular to the side edges of the PTFE liner. This will insure removal of any air bubbles that may exist between the PTFE liner and the adhesive coated thereon 11 and the substrate 2 to which the adhesive 11 is being adhered.

(3) While pulling back the polyethylene liner 12, the PTFE liner is rubbed, such as by use of the hard smooth tool 44, adjacent to the peeled back release liner 12 while the adhesive is caused to become attached to the substrate. After the release liner 12 is peeled back about 3–4 inches, it is important to keep the film and adhesive as close to the substrate as possible while removing the release liner for most efficient, accurate and reliable installation.

(4) With the initial strip of PTFE liner bonded to the substrate a second strip may be attached in the same manner, with the lengthwise dimension as close as possible to the priorly laid strip. In this case, the gap between adjacent strips may be closed by burnishing the two adjacent edges with a hard smooth tool. This causes the two adjacent edges to creep toward each other to close the gap.

Another way to install the next strip is to overlap the second strip longitudinally over the first strip with about a one inch overlap. The overlapped portions are then both cut at the center of the overlap. This is shown more clearly in FIG. 12, wherein first strip 50 is first attached in the manner set forth above, and then the second strip 51 is attached adjacent thereto with an overlap of "M" dimension, which is preferably about one inch. The cutting of ½ of M, or in this case ½ inch, is shown by the dotted line in FIG. 12. This is done for the entire length of both strips 50, 51. Then, excess material is removed from both strips 50,51. In that manner, the remaining edges of strip 50 and 51 will be closely adjacent to each other with very little gap therebetween. This removal can be done by first removing the upper most cut away piece, and then removing the lower most cut away piece. Then, the entire area, that is edges of both strips and the gap therebetween is thoroughly burnished with use of a smooth hard tool. This will cause the gap distance to be minimal. Also, the entire area may be sandpapered using a preferable 80 grit paper, until the entire area is smoothed with the two edges and gap become a unitary smooth surface which cannot be "caught" easily by any package corner or edge.

The ends of strips 50 and 51 are shown slightly offset for clarity of description. In practice the two ends would be of the same dimension. Also, this type of installation, may be used when repairing a priorly installed strip with an adjacent strip.

Thus, a feature of the invention is that after attaching the PTFE liner to the substrate, the exposed edges of the film are burnished with a smooth hard tool and/or sandpapered so that the gap therebetween is minimized and so that the exposed edges of the film will present a gradual smooth incline from one edge to the substrate and not provide any dislocations which might be caught by a package corner or edge. By such procedure, the effective lifetime of the PTFE lined chute is lengthened considerably.

(5) The foregoing steps can be done first on the side rails, as mentioned, and then the transport surfaces lined, or vise versa as desired. As discussed, the foregoing ranges of thicknesses and widths are preferred.

(6) With the flat transport surfaces done, then, the curved areas are lined with the PTFE liner. Of course, the curved area could instead be done first, and then the flat straight areas done thereafter. It has been discovered that a preferred shape for curved surface is to cut a piece which is a truncated cone, with a first dimension being the smallest dimension typically placed on the inner radius of the turn, a second dimension at the widest bottom dimension typically placed on the outside of the turn, and a third dimension between the first and second dimensions. Starting immediately to where the flat pieces are installed, the strips are applied beginning at the inside edge. The foregoing procedure is again used beginning adjacent to where the flat piece has been installed. Holding the PTFE strip as straight and square as possible to the top edge, the installation steps are repeated. An entire row of PTFE strips are applied along a top edge. Then, each succeeding piece is overlapped by one inch and the butted joints are prepared in the manner set forth and described with reference to FIG. 12, and burnished and/or sandpapered, as above discussed.

(7) With the first row completed, a second row is then installed in the same manner starting at the same starting point as the first row.

There results two butted joints, from piece to piece, which are worked in the same manner as above set forth.

(8) Then, all of the foregoing steps are repeated as suitable. In this manner, the entire surface and side walls and other surfaces are lined with the PTFE liner so that objects moved thereon will not be subjected to build-up, bridging, sticking, and the like, and movement will be continuous and uninterrupted.

Turning now to FIG. 14, when a "high spot" cannot be grounded out because of harm to structural integrity or for other reason the "high spot" will first be smoothed. Then, around such "high spot", such as shown in FIG. 14 as number 71, the PTFE layers 72 will be attached in the manner as aforementioned. The PTFE layer however will not cover the "high spots". Thus, there is no danger that any air bubbles will exist between the film and substrate at parts next to the "high spots". The "high spots" may be welds, joints, etc. Thus, advantageously, with the invention, the "high spots" are not removed and thereby diminish the integrity of the structure of the chute. Rather, in the invention, the structural integrity is retained while preventing package buildup. We have discovered that use of a PTFE liner around the "high spots" was sufficient to prevent build-up and provide continuous package movement.

Another feature of the invention is shown in FIG. 13, wherein slight tear or gouge or irregularity 61, such as caused by a irregular package may be found later in the installed PTFE liner 62 placed on surface 2. We have discovered that by cutting out the irregularity 61 in a diamond shaped piece 63, and then, replacing the cut away piece with another diamond shaped PTFE liner, an almost seamless patch could be laid without any curling at the edges of the replacement patch or previously laid PTFE liner. That is the diamond shape offers no direct horizontal seam (i.e. perpendicular to the travel direction) that may lead to a lifting up of the liner or replacement part therefor. Thus, a repair is made which is just as effective as the original PTFE liner. The diamond shaped patch is typically about 4 to 6 square inches. Larger areas may require a completely new strip of PTFE liner.

Also, as shown in FIG. 13, there may be scratches 64 in the PTFE liner on top of the substrate. It was discovered by the inventors that by merely sandpapering, such as using 80 grit sandpaper, for example 10 times, the scratches would be reduced by the area of the PTFE film around them being gradually reduced in vertical height so that a smooth surface would result and no exposed or uplifted surfaces would exist to "catch" the objects traveling in the chute.

MECHANICAL INSTALLATION

When it is desired to retro-fit an existing transport system, it has been found that a great deal of time and expense can be incurred when preparation of the transport surface is necessary. The time and expense of cleaning and preparing the transport surface can be avoided by performing a mechanical installation. A mechanical installation can be performed over any existing surfaces, either fouled or clean. Also a mechanical installation can be performed in only those areas which have been identified as problem spots, and only a portion of the transport substrate requires to be covered.

Mechanical installation of the inventive liner can be accomplished by fastening the liner to the transport substrate using a mechanical fastener such as a tree bolt. When it is desired to line an entire section of transport substrate, the area is measured, and a section of the liner is cut to correspond to the necessary measurement. The liner is then placed on the transport substrate and holes may be drilled through the liner and substrate thereby enabling a tree bolt to be pressed into place. The holes are typically drilled on the outermost portions, or outside of the wear area, of the liner thereby protecting the bolts from object impact. Alternatively, a self tapping screw may be used to fasten the liner to the transport substrate.

Figure 21:
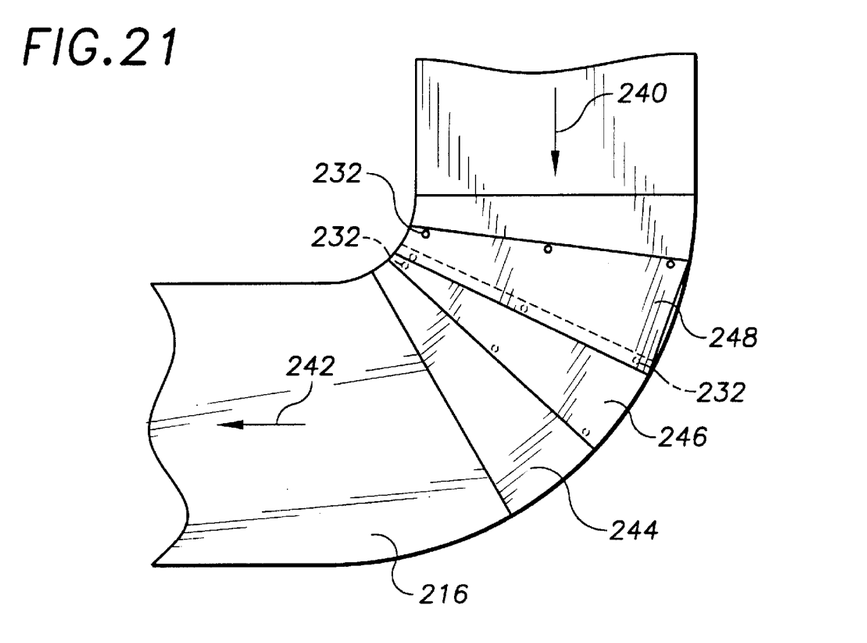
FIG. 21 is a top view of a 90 degree radius chute having laminate sections mechanically fastened in accordance with the present invention.

If it has been determined that only a portion of the transport substrate needs to be lined than typically the procedure is done by installing overlapping sections in a manner similar to installing roofing shingles. As shown in FIG. 21, sections 230 are overlapped and mechanically fastened to a transport substrate 216. In this example objects are traveling in the direction of arrows 240, and 242, from an elevated position at arrow 240 to a lower position at arrow 242. The liner material may be a section of skived PTFE, laminate, coated fabric, or a laminate having a conductive material depending on the flow of objects and static electrical assessment of the chute. Since this example depicts a 90 degree radius turn, a section similar to section 230 may be used. This enables efficient coverage of the transport substrate utilizing as few sections as possible with little waste.

Figure 22:
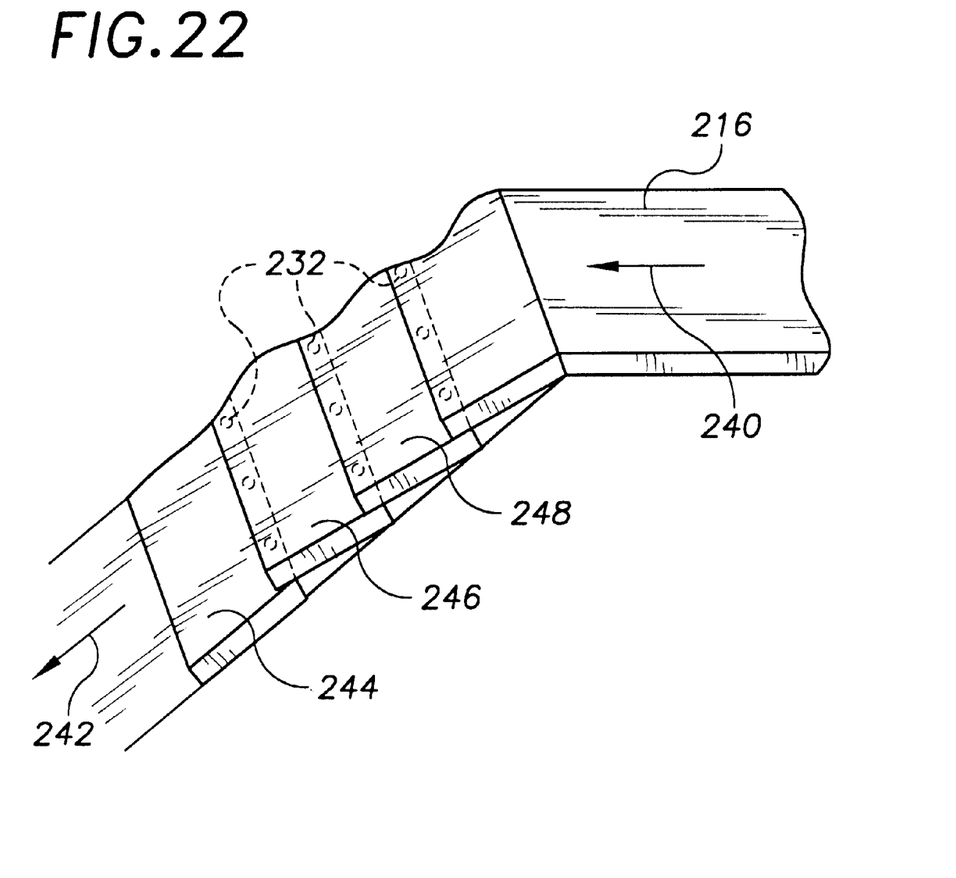
FIG. 22 is a perspective view of a shingling process used in mechanically fastening laminate sections to a chute in accordance with the present invention.

The first section 244 is placed on the transport substrate and secured using tree bolts placed in holes 232. The second section 246 is placed on transport substrate 216 such that its trailing edge overlaps first section 244, thereby covering the tree bolts placed within holes 232. Third section 248 is then placed on transport substrate 216 such that its trailing edge partially overlaps the leading edge of second section 246. As further illustrated in FIG. 22, the shingling effect protects the fasteners from the constant impact associated with a heavy flow of objects, while allowing access to individual sections for removal and repair.

When it is desired to remove a section for replacement or repair, the overlapping up-stream section can be lifted up, thereby exposing the fasteners of the desired section to be removed. This feature allows the removal and replacement of individual sections which may be subjected to increased wear, without removing the entire liner system.

As discussed above, the invention has overcome the disadvantages, problems and deficiencies in the prior art. Advantageously, the inventors have solved a problem that has plagued industry for a long time, and this invention has produced outstanding savings in time, money, effort, manpower, and increased speed of processing, reliability and efficiency. For example, since the invention was introduced, in one plant alone, the savings in Workman's compensation insurance rate has been substantial because the worker no longer had to shut down his regular work and climb up to dislodge the bridged objects, with the worker risking injury.

Also, previously, the flow of objects was "touch and go", it was never continuous. With the installation of the instant invention, the speed of processing has been increased by a substantial amount. In some cases, the speed of processing has increased by 100%.

Also, because the objects can now move unhindered, it is now possible to reduce the size of the chutes and/or increase the number of objects which are processed in the same line. This reduces costs substantially. Also, previously graphite and/or wax was used. This would be transferred to and contaminate associated conveyor belts, which then required replacement. The cost of replacement belts is substantial. Now, since the installation of the invention, such conveyor belts need not be periodically replaced due to contamination.

In addition to the package shipping industry, the present invention has applicability in a wide variety of areas. For example there are numerous applications within the field of food processing. There are many transport surfaces which deliver packaged or pre-packaged food products via gravity fed chutes and the like to various locations within the food processing facility. Quite often the production line needed to be shut down while the transport surface was cleaned, or the transport surface needed to be greased or floured to facilitate the transport of the food products. Use of the inventive liner can facilitate transport of food products without the use of grease or flour. This can greatly reduce the costs associated with constant shut downs, re-greasing or re-flouring of the transport surfaces. Similarly, food processing enterprises often require to "flash freeze" food products before shipment. These products are placed on metal trays lined with parchment paper, and the food products will tend to stick to the parchment paper thereby causing problems with removal. The metal trays are therefore banged or hit against an object to dislodge the frozen food that is sticking. Repeated dislodging of food in this manner will damage the trays resulting in frequent purchases of new trays. By either mechanically fastening or adhesively bonding a liner in accordance with the present invention to the trays, or other transport surfaces, removal of frozen food will be greatly simplified.

The foregoing is illustrative of the principles of the invention. Numerous extensions and modifications thereof will be apparent to workers skilled in the art. All such extensions and modifications are to be considered to be within the spirit and scope of the invention, as defined by the appended claims.

What is claimed is:

1. A chute for conveying an object comprising:
   a stationary transport substrate; and
   a fabric in sheet form having a fabric matrix embedded in non-stick material and a first side and a second side, said first side forming a non-stick surface facilitating conveyance of said object along said stationary transport substrate, said second side of said fabric being fixedly secured to said stationary transport substrate.

2. A chute as in claim 1, wherein an adhesive preapplied to said second side of said fabric bonds substantially all of said second side of said fabric to said stationary transport substrate.

3. A chute as in claim 1, wherein said second side of said fabric is mechanically secured to said stationary transport substrate with mechanical fasteners.

4. A chute as in claim 1, wherein said first side of said fabric has a textured surface which reduces surface area contact with a rigid object being conveyed by said chute.

5. A chute as in claim 1, wherein said non-stick material comprises PTFE, and said fabric comprises a woven glass matrix fabric.

6. A chute for conveying an object comprising:
   a stationary transport substrate;
   a first fabric having a fabric matrix embedded in non-stick material; and
   a second fabric having a fabric matrix embedded in non-stick material, said second fabric bonded to said first fabric forming a laminate having a first side and a second side, said first side forming a non-stick surface facilitating conveyance of said object along said stationary transport substrate, said second side of said laminate being secured to said stationary transport substrate.

7. A chute as in claim 6, wherein an adhesive bonds said second side of said laminate to said stationary transport substrate.

8. A chute as in claim 6, wherein said second side of said laminate is mechanically secured to said stationary transport substrate.

9. A chute as in claim 6, wherein said first side of said laminate has a textured surface which reduces surface area contact with a rigid object being conveyed by said chute.

10. A chute as in claim 6, wherein a conductive material is disposed on and integral with said second side of said laminate thereby dissipating electrical charge buildup on said laminate.

11. A chute as in claim 6, wherein said non-stick material contains a filler to prevent static electric buildup.

12. A chute as in claim 6, wherein said non-stick material comprises 0.1 to 1.0 percent by weight of carbon.

13. A chute as in claim 6, wherein said non-stick material comprises PTFE, and said fabric comprises a woven glass matrix fabric.

14. A method of conveying a plurality of objects in a transport system employing a combination of mechanical conveyors and chutes, comprising the steps of:
   identifying at least one specific chute where at least one object may block the transport of other objects being conveyed by said transport system; and
   lining a portion of said identified chute with a sheet member which facilitates the transport of said objects, wherein said sheet member comprises a fabric having a fabric matrix embedded in non-stick material and a first side and a second side, said first side forming a non-stick surface, said second side of said fabric being secured to said portion of said identified chute.

15. A method as in claim 14, wherein said first side of said fabric has a textured surface which reduces surface area contact with rigid objects being conveyed by said chute.

16. A method as in claim 14, wherein said identified chute has a heavy wear portion and a light wear portion, and only said heavy wear portion is lined.

17. A method as in claim 14, wherein said sheet member comprises a laminate.

18. A method as in claim 17, wherein said laminate comprises:
   a first fabric having a fabric matrix embedded in non-stick material; and
   a second fabric having a fabric matrix embedded in non-stick material, said second fabric being bonded to said first fabric thereby forming said laminate and having a first side and a second side, said first side of said laminate forming a non-stick surface facilitating conveyance of said object along said identified chute, said second side of said laminate being secured to said portion of said identified chute.

19. A method as in claim 18, further comprising:
   identifying an area of the identified chute where static electric charge tends to accumulate; and
   lining said area with a section of said laminate having a conductive material disposed on and integral with said second side of said laminate section thereby dissipating electrical charge buildup on said laminate section.

20. A method as in claim 18, wherein said non-stick material contains a filler to prevent static electric buildup.

21. A method as in claim 18, wherein said non-stick material comprises 0.1 to 1.0 percent by weight of carbon.

22. A method as in claim 18, wherein an adhesive bonds said second side of said laminate to said identified chute.

23. A method as in claim 18, wherein said second side of said laminate is mechanically secured to said identified chute.

24. A method as in claim 18, wherein said non-stick coating comprises PTFE.

25. A method of facilitating movement of objects on a stationary transport substrate, comprising:
   identifying a wear path portion of said stationary transport substrate over which objects are biased to move; and
   applying a reinforced liner in sheet form, having an exposed non-stick surface, to at least said wear path portion of said stationary transport substrate, said reinforced liner comprising a fabric having a fabric matrix embedded in non-stick material.

26. A method as in claim 25, wherein said liner is applied only to said wear path portion of said stationary transport substrate.

27. A method as in claim 25 herein said reinforced liner comprises a laminate comprising multiple layers of said fabric.

28. A liner for enhancing conveyance of objects on and relative to a transport substrate, comprising:
   a fabric having a fabric matrix embedded in non-stick material and a first side and a second side, said first side forming a non-stick surface facilitating conveyance of said objects on and relative to said transport substrate; and securing means for fixedly securing said fabric to said transport substrate with said second side facing said transport substrate in combination with said transport substrate.

29. Apparatus for conveying objects comprising:

a transport substrate supporting objects for movement on and relative to said substrate; and a reinforced liner comprising a fabric in sheet form having a fabric matrix embedded in non-stick material, said reinforced liner having a first side and a second side, said first side presenting a non-stick surface facilitating movement of said objects on and relative to said transport substrate, and said second side being fixedly secured to said transport substrate.

30. The apparatus of claim 29 wherein said objects comprise one of packages and food products.

31. The apparatus of claim 29 wherein said reinforced liner comprises one of:

a single layer of said fabric; a laminate of multiple layers of said fabric bonded together; and a laminate of multiple layers of said fabric bonded together and having a conductive material disposed on and integral with a second side of said laminate.

32. The apparatus of claim 31 wherein said reinforced liner comprises at least a first section and a separate second section, said first section and said second section being secured to said transport substrate such that a trailing edge of the first section overlaps a leading edge of the second section, said leading edge and said trailing edge being defined relative to a direction of movement of said objects on said transport substrate.

33. The apparatus of claim 32 wherein the leading edge of said second section is secured to said transport substrate with mechanical fasteners, and the trailing edge of the first section overlies said mechanical fasteners.

34. The apparatus of claim 33 wherein at least one of said first section and said second section has a trapezoidal shape with one side edge longer than an other side edge.

35. A method of facilitating movement of objects on and relative to a transport substrate, comprising:

identifying a heavy wear area of the transport substrate; and securing a reinforced liner comprising a fabric having a fabric matrix embedded in non-stick material to said heavy wear area, said reinforced liner having a first side and a second side, said first side forming a non-stick surface facilitating movement of said objects, and said second side being fixedly secured to said heavy wear area of the transport substrate.

* * * * *

UNITED STATES PATENT AND TRADEMARK OFFICE
CERTIFICATE OF CORRECTION

PATENT NO. : 6,216,842 B1
DATED : April 17, 2001
INVENTOR(S) : Beale et al.

It is certified that error appears in the above-identified patent and that said Letters Patent is hereby corrected as shown below:

Column 1,
Line 9, delete "09/048,817" and insert -- 09/049,817 --.

Claim 27, column 18,
Line 16, delete "herein" and insert -- wherein --

Claim 28, column 18,
Line 65, delete "," after substrate and insert -- in combination with said transport substrate -- before the word comprising.

Signed and Sealed this

Thirtieth Day of October, 2001

Attest:

NICHOLAS P. GODICI
*Acting Director of the United States Patent and Trademark Office*

*Attesting Officer*

UNITED STATES PATENT AND TRADEMARK OFFICE
CERTIFICATE OF CORRECTION

PATENT NO. : 6,216,842 B1
DATED : April 17, 2001
INVENTOR(S) : Beale et al.

It is certified that error appears in the above-identified patent and that said Letters Patent is hereby corrected as shown below:

Column 1,
Line 9, delete "09/048,817" and insert -- 09/049,817 --.

Column 18,
Line 61, delete "herein" and insert -- wherein --.
Line 65, delete "," after "substrate" and insert -- in combination with said transport substrate -- before the word comprising.

This certificate supersedes Certificate of Correction issued October 30, 2001.

Signed and Sealed this

Second Day of July, 2002

*Attest:*

*Attesting Officer*

JAMES E. ROGAN
*Director of the United States Patent and Trademark Office*